United States Patent [19]

Warkentin

[11] 3,959,516
[45] May 25, 1976

[54] PROCESS FOR PRODUCING A SOLID CHOCOLATE COMPOSITION SUITABLE FOR COATING ICE CREAM

[75] Inventor: Brian T. Warkentin, Sunnyvale, Calif.

[73] Assignee: Shade Foods, Inc., Belmont, Calif.

[22] Filed: Apr. 14, 1975

[21] Appl. No.: 567,508

Related U.S. Application Data

[63] Continuation-in-part of Ser. No. 501,787, Aug. 29, 1974, abandoned.

[52] U.S. Cl. ............................ 426/631; 426/306; 426/659; 426/660; 426/662
[51] Int. Cl.² ........................................ A23G 1/00
[58] Field of Search ............ 426/331, 631, 659, 660, 426/662, 306

[56] References Cited
UNITED STATES PATENTS

| | | | |
|---|---|---|---|
| 2,188,489 | 1/1940 | Veatch | 426/660 |
| 2,221,563 | 11/1940 | Young | 426/659 |
| 2,287,838 | 6/1942 | Stanley | 426/660 X |
| 2,459,908 | 1/1949 | Alikonis | 426/660 |
| 2,487,931 | 11/1949 | Lataner | 426/660 |
| 2,760,867 | 8/1956 | Kempf et al. | 426/660 |
| 3,098,746 | 7/1963 | Noznick et al. | 426/660 |

FOREIGN PATENTS OR APPLICATIONS

| | | | |
|---|---|---|---|
| 672,081 | 10/1963 | Canada | 426/631 |
| 805,353 | 12/1958 | United Kingdom | 426/631 |

*Primary Examiner*—S. Leon Bashore
*Assistant Examiner*—Arthur L. Corbin

[57] ABSTRACT

A process is provided for the production of a solid chocolate composition which can be dispersed in vegetable oil to produce a chocolate liquid suitable for coating ice cream. The process comprises milling a mixture of cocoa powder with or without added chocolate liquor, sugar, hydrogenated vegetable oil, salt, lecithin and optionally whey powder or low fat milk powder to form a paste, roll refining the paste to form a sheet, breaking up the sheet and mixing it with hydrogenated vegetable oil, heating and agitating the resultant mixture and thereafter extruding and cooling small globs of the mixture to form the solid chocolate composition.

2 Claims, No Drawings

PROCESS FOR PRODUCING A SOLID CHOCOLATE COMPOSITION SUITABLE FOR COATING ICE CREAM

This application is a continuation-in-part of application Ser. No. 501,787 filed Aug. 29, 1974, now abandoned.

BACKGROUND OF THE INTVENTION

A very substantial proportion of all ice cream consumed reaches the consumer in the form of a small ice cream bar having a thin exterior coating of chocolate covering its surface. These bars are prepared by dipping the solid ice cream in a sweet chocolate liquid and then withdrawing it. The chocolate liquid solidifies at ice cream teperature forming a thin chocolate coating that covers the exterior of the ice cream bar.

In the usual commercial practice, the ice cream manufacturer prepares the ice cream bars and chocolate processors prepare chocolate liquids in finished form ready for immediate use in coating the ice cream bars. These liquids are shippd to the ice cream manufacturers in steel drums or in tank-trucks, or tank cars.

Representative chocolate liquids suitable for coating ice cream bars are commonly prepared by stirring together cocoa powder, sugar, salt, vegetable oil, milk powder and lecithin with a vigor and for a time to produce a moderately stable dispersion of the solids in the vegetable oil. Chocolate liquids of this kind are manufactured and sold in very large volumes. While these liquids have been extensively used over a long period of time and yield an acceptable product, their use requires constant and expensive attention to cope with certain problems which arise out of inherent properties of the liquids. When these liquids stand in storage, they tend to solidify at ambient temperature. If they are stored in drums, it is necessary to store the drums in a heated storage space in oder to maintain the liquid in a sufficiently fluid form to permit it to be poured from the drums into the dipping vessel. If they are stored in large storage tanks, it is necessary to jacket the tanks and supply sufficient steam or hot water to the jacket to keep the liquids in fluid form. During storage over the periods commonly experienced in commercial use of these materials, the solid components settle out of the vegetable oil forming heavy mud-like deposits in the bottoms of the containers. Where the container is a drum, it is necessary to subject the contents of the drum to agitation for considerable periods in order to put the solids back into reasonably uniform dispersion in the oil. Where the liquids are stored in larger tanks, it is necessary to supply continuous agitation to these tanks in order to maintain the solid components in suspension and so permit withdrawal of a reasonably uniform dispersion of solids in oil from the bottoms of storage tanks. These problems can be coped with an are coped with, but coping with them is a continuous expensive nuisance.

GENERAL DESCRIPTION OF THE INVENTION

Recourse to the present invention completely bypasses the problems above noted for manufacturers of chocolate coated ice cream bars. Pursuant to the present invention, solid chocolate wafers having a softening point about 100°F. are supplied to the ice cream bar manufacturer instead of a finished dipping liquid. In order to prepare a choccolate dipping liquid, the manufacturer simply stirs the chocolate wafers into warm (110°F. – 130°F.) vegetable oil. Approximately equal weights of the solid chocolate wafers and the warm vegetable oil are used in the preparation of the finished dipping liquid. The dipping liquid can be prepared in batches sized to accommodate a contemplated run and essentially no storage of dipping liquid is involved.

The solid chocolate wafers consist essentially of a macroscopically homogeneous mixture of about 12 to 24 parts by weight of cocoa powder or a mixture of cocoa powder and chocolate liquor, 35 to 60 parts by weight of sugar, about 20 to 32 parts by weight of hydrogenated vegetable oil, about 0 to 10 parts by weight of low-fat milk powder or whey powder or mixtures of the two, about 0.3 to 0.7 parts by weight of lecithin and from about 0.2 to 0.5 parts by weight of common salt. From 1.5 to 15 parts by weight of cocoa butter are contained, in the low-fat cocoa powder and chocolate liquor used to supply the required cocoa content.

DETAILED DESCRIPTION OF THE INVENTION

The manufacture of solid chocolate wafers having representative compositions are described in the following examples.

EXAMPLE I 15.7 parts by weight of low-fat cocoa powder (about 10% by weight cocoa butter content), 55.2 parts by weight of sugar, 10–16, preferably 14.1, parts by weight of hydrogenated vegetable oil, 0.27 parts by weight of salt, 0.2 parts by weight of vanilla and 0.46 parts by weight of lecithin were placed in a milling paste mixer. The mixer is run until the mixture is ground into a smooth paste. The paste is passed through a stainless steel roll refiner which extrudes it as a thin layer. The layer is broken up and then mixed and heated with an additional 14.1 parts by weight of hydrogenated vegetable oil and run through a ribbon blender to reduce it to a liquid state. The liquid is pumped into a heated high speed mixing tank where it is mixed and further milled. The liquid is then pasteurized by heating to about 140°F. and held at that temperature for about 15 minutes during which agitation is continued. The liquid product is then pumped into a storage tank from which it is fed onto a moving rubber conveyor belt. A depositing head squirts out small globs of this liquid mixture onto the moving belt which passes through a cooling tunnel where refrigerated air is circulated around it. The glob solidifies forming wafers which are carried out of the cooling tunnel and dropped into cartons. Wafers are about 1 inch in diameter and about ⅜ inch thick. The wafters have an incipient softening point about 95°C. and melt at 100°F. – 102°F. The wafers have an average weight of about 1/5 ounce. They may be made larger but should not exceed about 1 ounce in weight in order to facilitate weighing to close tolerances and facilitate melting and mixing during their use to produce the finished dipping liquor composition.

The wafers can be stored indefinitely without any deterioration.

EXAMPLE II

The procedure shown in Example I was followed in preparing a solid chocolate product differing in composition from the composition prepared in Example I in that a part of the cocoa is provided by chocolate liquor, some low-fat milk powder is added and the content of hydrogenated vegetable oil is reduced since the chocolate liquor provides some fat. The total composition of the solid is made up of 12.2 parts by weight of low-fat cocoa powder, 22.9 parts by weight of chocolate liquor (50% cocoa butter), 37.8 parts by weight of sugar, 6.1 parts by weight of low-fat milk powder, 0.4 parts by weight of lecithin, 0.3 parts by weight of salt, 0.1 parts by weight of vanilla and 20.1 parts by weight of hydrogenated vegetable oil. As in Example I the hydrogenated vegetable oil is introduced into the composition in two approximately equal increments as the milling procedure goes forward.

While the foregoing examples indicate parts by weight of each component of the compositions prepared, the range of proportions of the several components are conveniently expressed in terms of weight percent of each component in the total composition as follows:

| | |
|---|---|
| Coca powder (fat free basis) | 12–24 |
| Cocoa butter (contained in cocoa powder and chocoate liquor) | 1.5–15% |
| Sugar | 35–60% |
| Hydrogenated vegetable oil | 20–32% |
| Low-fat milk powder | 0–10% |
| Lecithin | 0.3–0.6% |
| Salt | 0.2–0.4% |
| Vanilla | 0.1–0.2% |

A chocolate liquid suitable for coating ice cream can be prepared from the wafers described above at any time by simply stirring a given weight of the wafers into an approximately equal weight of vegetable oil. Typically, the wafer-vegetable oil mixture will consist of 40 to 50 parts by weight of wafers and 50 to 60 parts by weight of vegetable oil, vegetable oil being present, preferably, in small excess over the weight of wafers.

The ingredients required for preparation of the solid chocolate wafers are all readily available in commercial quantities.

The cocoa component of the wafer may be either chocolate liquor obtained by grinding cocoa nibs and having a high cocoa butter content or cocoa powder obtained by removing part of the cocoa butter from chocolate liquor. Low-fat cocoa powder having a cocoa butter content of 10–12% may be used to produce a satisfactory wafer, but the flavor of the product obtained using chocolate liquor is favored by some consumers. Whether the cocoa component is provided by low-fat cocoa powder or by a mixture of low-fat cocoa powder and chocolate liquor, the quantity employed is such that its fat-free cocoa content provides 12–24% by weight of the total composition.

The sugar is peferably powdered at the outset, but the milling of the mixture permits the use of granulated sugar, if desired, since the extended milling grinds all of the solid components into extremely fine particles.

The hydrogenated vegetable oil can be any unsaturated vegetable oil, such as coconut oil, cottonseed oil, corn oil, etc., which has been hydrogenated to a degree that takes its melting point to at least 100°F.

The whey powder is obtained by spray during drying whey and the whey powder can be replaced by low-fat or non-fat milk powder obtained by spray drying defatted milk. Mixtures of whey powder and low-fat milk powder may be used.

The salt is added to the initial mixture subjected to milling in order to obtain an extremely good dispersion of the salt in the hydrogenated vegetable oil. The quantity of salt added is sufficient to supply the total salt requirement for the finished dipping liquid, which means that the wafers themselves have a higher salt content than would be permissible from a taste standpoint if the wafers were to be consumed as such.

The proportions of the ingredients used in producing the wafers is that indicated above under the general description of the invention. Satisfactory wafers are obtained when the proportions of the several ingredients are held within the ranges set out.

It should be noted that the above described compositions are free of materials such as starch which would react with casual water introduced, for instance, during the ice cream dipping operation causing viscocity increase with the result that coating thickness would increase during a run.

I claim:

1. A process for the production of a solid chocolate composition which can be dispersed in an approximately equal weight of vegetable oil to produce a chocolate liquid suitable for coating ice cream which comprises
    1. charging to a milling zone:
        a. 12 to 24 parts by weight of cocoa powder or a mixture of cocoa powder and chocolate liquor,
        b. 35 to 60 parts by weight of sugar,
        c. 10 to 16 parts by weight of hydrogenated vegetable oil,
        d. up to 10 parts by weight of whey powder or low-fat milk powder or mixtures thereof, and
        e. from 0.2 to 0.4 parts by weight of common salt, and
        f. 0.3 to 0.7 parts by weight of lecithin
    2. milling the mixture to form a paste,
    3. passing the paste through a roll refining zone to form a thin sheet,
    4. breaking up the sheet and mixing it with hydrogenated vegetable oil in amount sufficient to bring the total hydrogenated vegetable oil content of the mixture to a level in the range 20 to 32 parts by weight,
    5. heating and agitating the resultant mixture,
    6. raising the temperature of the mixture to pasteurization temperature and agitating it at such temperature for about 15 minutes, and then
    7. extruding small globs of the mixture and cooling them to ambient temperature.

2. The method of claim 1 which comprises subsequently mixing 40 to 50 parts by weight of the cooled, extruded chocolate globs with 50 to 60 parts by weight vegetable oil.

* * * * *